United States Patent [19]

Puri

[11] Patent Number: 5,605,337
[45] Date of Patent: Feb. 25, 1997

[54] PIVOTING SEAL FOR OIL-FILLED ROTATING MACHINE

[75] Inventor: Bhapinder Puri, Ann Arbor, Mich.

[73] Assignee: General Motors Corporation, Detroit, Mich.

[21] Appl. No.: 617,514

[22] Filed: Mar. 13, 1996

[51] Int. Cl.$^6$ ............................................. F16J 15/32
[52] U.S. Cl. ................................. 277/8; 277/9; 277/30; 277/152; 277/153; 464/16; 403/12; 403/288; 403/359
[58] Field of Search .................. 277/8, 9, 9.5, 11, 277/30, 32, 152, 153; 464/16; 403/12, 288, 359

[56] References Cited

U.S. PATENT DOCUMENTS

| | | | |
|---|---|---|---|
| 3,337,221 | 8/1967 | Hulsebus et al. | 277/8 |
| 3,577,746 | 5/1971 | Dolan | 464/16 |
| 4,081,218 | 3/1978 | Gabriel | 277/9 |
| 4,669,737 | 6/1987 | Diffenderfer | 277/9 |
| 4,817,846 | 4/1989 | Eichinger | 277/9 |
| 5,224,762 | 7/1993 | Levenstein | 277/9 |
| 5,244,215 | 9/1993 | Cather, Jr. et al. | 277/9 |
| 5,460,386 | 10/1995 | McCoy et al. | 277/9 |

*Primary Examiner*—Scott Cummings
*Attorney, Agent, or Firm*—Charles E. Leahy

[57] ABSTRACT

A rotating machine has a splined primary shaft rotatably mounted in an opening of an oil-filled housing and a primary seal carried by the housing for sealingly engaging with a mating splined secondary shaft upon insertion of the secondary shaft into the housing opening for engagement with the splined primary shaft. An annular seal is also carried by the housing and has a flexible sealing lip for sealing engagement with the primary shaft to maintain oil within the housing. The annular seal has an abutment lever which extends toward the opening to be engaged by the splined secondary shaft upon insertion of the secondary shaft through the housing opening to forcibly pivot the flexible sealing lip of the annular seal away from sealing engagement with the primary shaft and thereby permit oil to flow to lubricate the splines between the primary and secondary shafts.

5 Claims, 1 Drawing Sheet

PIVOTING SEAL FOR OIL-FILLED ROTATING MACHINE

The invention relates to a pivoting seal structure for normally sealing a housing opening through which a splined primary shaft extends and which opens oil flow communication to the splines only after a secondary splined shaft has been engaged with the primary shaft.

BACKGROUND OF THE INVENTION

It is well known in rotating machines such as automotive transmissions to provide a housing in which gear mechanisms are provided to control the speed and direction of a splined primary shaft. The splined primary shaft is aligned with an opening in the housing to permit the insertion of a splined secondary shaft for mating with the splined primary shaft.

Because the gearing of the transmission must be lubricated, it is well known to fill the housing with oil or other suitable lubricant. In order to prevent leakage from the housing, it is well known to mount a primary seal within the opening of the housing to engage with the splined secondary shaft upon insertion thereof into the opening to thereby establish the oil tight integrity of the transmission housing. It has been recognized in the prior art that this construction prevents filling of the transmission housing with oil until after the secondary shaft has been installed to engage with the primary seal.

Accordingly, the prior art also teaches the provision of a annular cup which is press fit onto the splined primary shaft and reaches through the housing opening to engage with the primary seal thereby establishing oil tight integrity of the transmission housing even before the secondary shaft is mated with the splined primary shaft. Although this prior art construction serves to retain oil within the transmission housing, the splined end of the primary shaft is not bathed in oil, and, accordingly the connection between the splined primary and secondary shafts must be packed with grease to assure proper lubrication over the life of the rotating machine.

It would be desirable to provide a seal arrangement which would both permit filling of the transmission oil prior to insertion of the splined secondary shaft, and also assure flow of oil to the splined connection between the splined primary shaft and the mating splined secondary shaft to assure lubrication thereof.

SUMMARY OF THE INVENTION

According to the present invention, a rotating machine has a splined primary shaft rotatably mounted in an opening of an oil-filled housing and a primary seal carried by the housing for sealingly engaging with a mating splined secondary shaft upon insertion of the secondary shaft into the housing opening for engagement with the splined primary shaft. An annular seal is also carried by the housing and has a flexible sealing lip for sealing engagement with the primary shaft to maintain oil within the housing. The annular seal has an abutment lever which extends toward the opening to be engaged by the splined secondary shaft upon insertion of the secondary shaft through the housing opening to forcibly pivot the flexible sealing lip of the annular seal away from sealing engagement with the primary shaft and thereby permit oil to flow to lubricate the splines between the primary and secondary shafts.

DESCRIPTION OF THE PREFERRED EMBODIMENT

Figure 1:
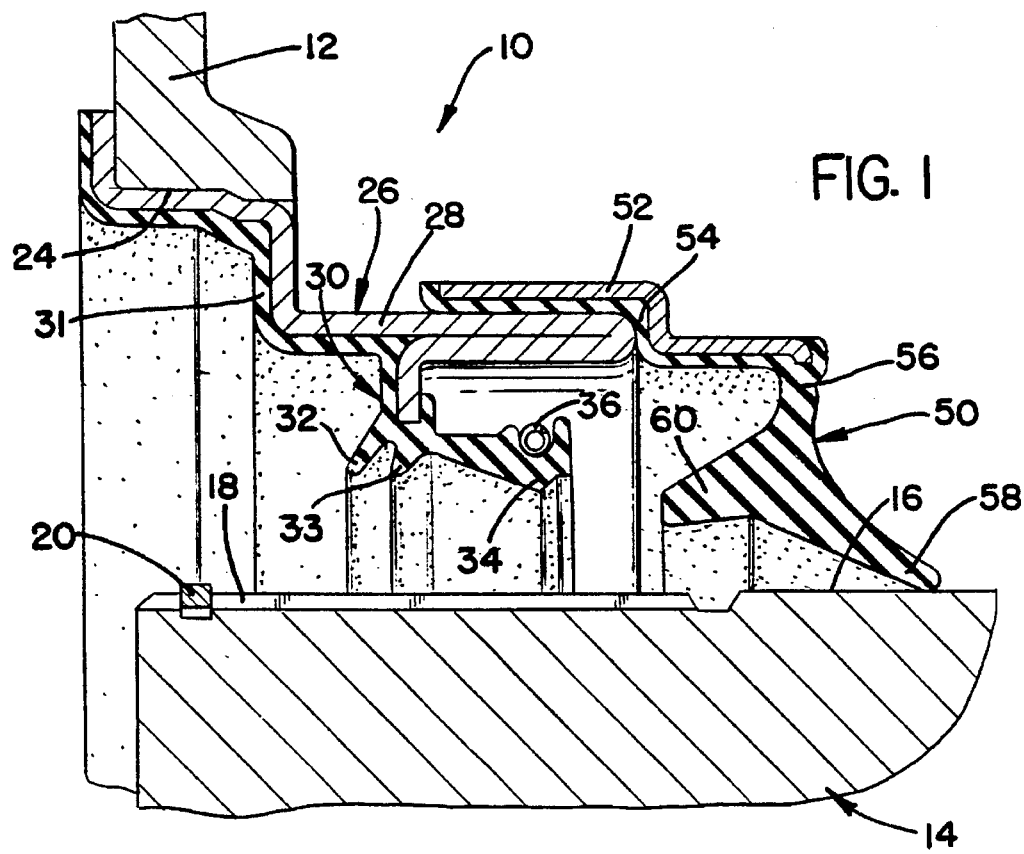
FIG. 1 is an enlarged fragmentary view of a transmission showing a primary seal for sealing against a splined secondary shaft and an annular seal which seals against the splined primary shaft, and installation of the splined primary shafts.

Referring to FIG. 1, a rotating machine 10 such as a transmission for a motor vehicle includes a housing 12 in which a splined primary shaft 14 is rotatably mounted and connected to a gear train or other controlling mechanism, not shown. The splined primary shaft 14 has an unsplined portion 16 and an outer end which carries conventional splines 18. A retaining ring 20 seats in a groove at the outermost end of the splined primary shaft 14 to couple with a secondary shaft.

The transmission housing 12 has an oversized opening 24 which registers with the splined primary shaft 14. A primary seal assembly 26 is mounted within the opening 24 and includes a metallic mounting ring 28 and an elastomeric seal element 30. The seal element 30 includes a boot 31, outer sealing flexible lips 32 and 33, and an inner sealing lip 34. The seal element 30 also includes a coil spring 36 which urges radial contraction of the seal element 30.

Figure 2:
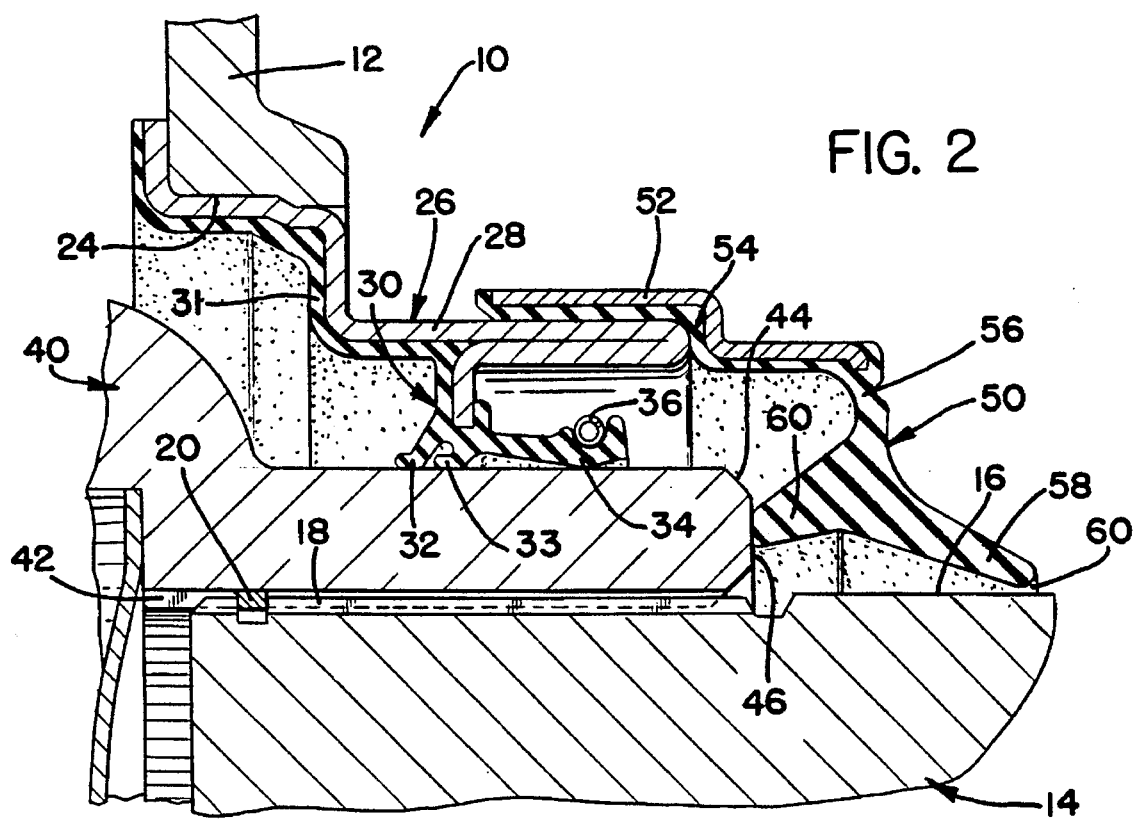
FIG. 2 is a section view through the transmission housing showing the secondary shaft having been installed onto the splines of the primary shaft and having pivoted the annular seal to its open position permitting flow of oil to the splines between the primary and secondary shafts.

As seen in FIG. 1, the sealing flexible lips 32, 33 and 34 of the seal element 30 are substantial greater in diameter than the splines 18 of the output shaft 14 in order to permit the insertion of a splined secondary shaft 40 into the housing as seen in FIG. 2. The splined secondary shaft 40 is an annular tube with internal splines 42 provided on an interior bore thereof. The outer surface of the splined secondary shaft 40 passes through the outer sealing lips 32 and 33 of the annular seal 30 as facilitated by a chamfer 44 provided on the end face 46 of the splined secondary shaft 40. Furthermore, the insertion of the splined secondary shaft 40 also expands the inner sealing flexible lip 34. Accordingly, as seen in FIG. 2, the sealing lips 32, 33 and 34 bear upon the outer diameter of the splined secondary shaft 40 to create a fluid tight sealing interface between the housing 12 and the splined secondary shaft 40.

Referring again to FIG. 1, there is shown an annular seal assembly 50 for making a fluid tight sealed connection between the housing 12 and the splined output shaft 14. The annular seal assembly 50 includes a stepped annular ring 52 which is lined by a seal boot 54. The ring 52 and the boot 54 are press fit onto the mounting ring 28 so that the seal assembly 50 is fixedly mounted on and carried by the housing 12. The seal assembly 50 includes a fulcrum portion 56 which reaches radially between the splined primary shaft 14 and the mounting ring 28 and carries a flexible sealing lip 58 with a closed position bearing on the shaft 14 to create a fluid tight seal between the shaft 14 and the housing 12. Accordingly, the transmission housing may be filled with oil or other fluid and such fluid will be prevented from leaking through the opening 24 of the transmission housing 12. As seen in FIG. 1, the seal assembly 50 also includes an annular abutment 60 which faces toward the opening 24 through which the splined secondary shaft 40 will be inserted.

Referring to FIG. 2, it will be seen and understood that the insertion of the secondary splined shaft 40 into the opening 24 of the housing will cause the end face 46 of the shaft 40 to engage with and forcibly displace the abutment 60 rightwardly, as viewed in FIG. 2. This rightward movement of the abutment 60 will cause pivoting displacement of the abutment 60 and sealing lip 58 about the fulcrum portion 56 and thereby lifts the flexible sealing lip 58 radially out of engagement with the splined secondary shaft 14. This outward radial lifting of the flexible lip 58 to an open position creates a flow passage 60 all around the circumference of the primary shaft 14 so that oil within the transmission housing is permitted to flow into the interface between the splines 18 and 42 of the shafts.

Thus, it is seen that the invention provides a new and improved pivoting seal assembly which permits the assembly and disassembly of a splined secondary shaft into mating connection with a splined primary shaft of a transmission housing without the loss of lubricating fluid from the transmission housing.

It will be understood that the pivoting seal assembly, as shown and described herein, is described as relating to an automotive transmission. However, the pivoting seal assembly for retaining fluid within a housing may be employed in the environment of any rotating machine application in which it is desired to assemble or disassemble splined shafts within an oil filled housing.

I claim:

1. In a rotating machine having a splined primary shaft rotatably mounted in an opening of an oil filled housing, a primary seal carried by the housing for sealingly engaging with a splined secondary shaft upon insertion of the splined secondary shaft into the opening and into engagement with the splined primary shaft, the improvement comprising:

an annular seal carried by the housing and having a flexible sealing lip normally closed about and sealingly engaging with the primary shaft to maintain oil within the housing, said annular seal having an abutment portion thereof extending to be engaged by the splined secondary shaft upon insertion of the splined secondary shaft through the housing opening and into sealing engagement with the primary seal to forcibly displace the annular seal and move the flexible sealing lip radially outward to an open position away from sealing with the primary shaft and thereby permit the flow of oil to the splines between the primary and secondary shafts.

2. In a rotating machine having a splined primary shaft rotatably mounted in an opening of an oil filled housing, a primary seal carried by the housing for sealingly engaging with a splined secondary shaft upon insertion of the splined secondary shaft into the opening and into engagement with the splined primary shaft, the improvement comprising:

an annular seal carried by the housing and having a flexible sealing lip for sealing engagement with the primary shaft to maintain oil within the housing, said annular seal also having an abutment lever extending to be engaged by the splined secondary shaft upon insertion of the splined secondary shaft through the housing opening and into sealing engagement with the primary seal to forcibly pivot the flexible sealing lip of the annular seal away from sealing engagement with the primary shaft and thereby permit the flow of oil to the splines between the primary and secondary shafts.

3. The improvement of claim 1 further characterized by the splined secondary shaft having an end face and the abutment lever of the annular seal being radially aligned with and engaged by the end face to pivot the flexible sealing lip away from the primary shaft.

4. The improvement of claim 1 in further characterized by the annular seal having a central fulcrum portion carried by the housing, the flexible sealing lip extending from the fulcrum in the direction away from the opening, and the abutment lever extending from the fulcrum portion in the direction toward the opening.

5. In a rotating machine having a primary shaft with an unsplined portion rotatably mounted in an oil filled housing and a splined portion thereof registering with an oversized opening in the housing, a primary seal carried by the housing opening for sealingly engaging with a splined secondary shaft upon insertion of the splined secondary shaft into the opening and into spline-mating engagement with the splined primary shaft, the improvement comprising:

an annular seal located axially inboard the primary seal and having a flexible sealing lip for sealing engagement with the primary shaft to maintain oil within the housing, an abutment lever extending to be engaged by the splined secondary shaft upon insertion of the splined secondary shaft through the housing, and a fulcrum portion axially intermediate the flexible sealing lip and the abutment lever and extending radially outward and carried by the housing whereby upon insertion of the splined secondary shaft through the housing opening said splined secondary shaft first obtains sealing engagement with the primary seal and upon further insertion the secondary shaft engages with the abutment lever to bias the annular seal about the fulcrum portion thereby lift the flexible sealing lip radially outward away from sealing engagement with the splined primary shaft to thereby open a path of oil flow to the splined portion of the splined primary shaft so that the mating splines between the primary and secondary shafts are bathed in oil.

* * * * *